– – –

United States Patent Office 3,526,696
Patented Sept. 1, 1970

3,526,696
SHIPPING FEVER VACCINE
Charles Gale and Earl E. Ose, Indianapolis, Ind., assignors to Eli Lilly and Company, Indianapolis, Ind., a corporation of Indiana
No Drawing. Continuation-in-part of application Ser. No. 630,529, Apr. 13, 1967, which is a continuation-in-part of application Ser. No. 565,397, July 15, 1966. This application Feb. 14, 1968, Ser. No. 705,315
The portion of the term of the patent subsequent to Mar. 17, 1987, has been disclaimed
Int. Cl. C12k 5/00
U.S. Cl. 424—89          5 Claims

ABSTRACT OF THE DISCLOSURE

An improved shipping fever composition of inactivated *Pasteurella multocida* and *Pasteurella hemolytica*, an aluminum ion adjuvant, and a live, attenuated, myxovirus parainfluenza-3 virus.

CROSS REFERENCE

This application is a continuation-in-part of our copending application Ser. No. 630,529, filed Apr. 13, 1967, entitled "Shipping Fever Vaccine," which application is a continuation-in-part of our prior application, Ser. No. 565,397, filed July 15, 1966, now abandoned.

BACKGROUND OF THE INVENTION

The occurrence of myxovirus parainfluenza-3 virus and Pasteurella organisms in the respiratory tract of cattle has been well documented. That these agents are important etiological agents in the shipping fever complex is now well established. The etiological factors in shipping fever are apparently a complex of several elements. The hypothesis of a virus, perhaps latent, being activated by the stress of shipment to make a favorable environment for secondary bacteria finds some support in experimental studies conducted by those in the veterinary medical science. It is well established that myxovirus parainfluenza-3 viruses are widely distributed and result in a spectrum of clinical disorders varying from mild clinical disease to severe disease that can result not only in clinically apparent respiratory signs but death of the animal. A considerable amount of data indicating that Pasteurella species play a role in shipping fever have appeared in the literature.

The vaccines prepared before this invention, in attempts to find an effective immunizing agent for healthy cattle against the shipping fever disease or complex, have not been satisfactory in that they have provided inadequate protection. In The Cornell Veterinarian, Vol. 54 (January 1964), in an article entitled "Experimental Immunization of Cattle Against Shipping Fever," it was concluded that a formol-inactivated vaccine composition in which the virus and bacterial portions were concentrated separately and mixed with an oil adjuvant gave inadequate protection. Thus, earlier vaccines have failed to provide the desired immunization in cattle. The cattle raising industry is still seeking a satisfactory immunizing composition for use in preventing the effects of the shipping fever complex in cattle.

In our prior application, indicated above, we disclosed and claimed new effective shipping fever vaccine compositions comprising inactivated forms of *Pasteurella multocida* and *P. hemolytica* and an inactivated form of myxovirus p. influenza with an aluminum ion adjuvant. Those compositions are effective shipping fever vaccines but best practice with those vaccines requires two injections to give substantial immunity to shipping fever. There is a need in the cattle raising industry for an improved shipping fever composition that can be administered, as by injection, of one dose to obtain substantial immunity to shipping fever.

It is an object of this invention to provide an improved shipping fever vaccine composition which will give substantial protecton to cattle against shipping fever, and reduce the labor of administration by requiring the use or injection of only one dose of the composition.

It is a more specific object of this invention to provide an improved one dose shipping fever composition containing a live, attenuated myxovirus parainfluenza-3 virus, together with inactivated Pasteurella sp. bacteria, and an alumina ion adjuvant.

Other objects, aspects, and advantages of this invention will become apparent from the description which follows:

SUMMARY OF THE INVENTION

Briefly, this invention provides a new shipping fever composition comprising a live, attenuated myxovirus parainfluenza-3 virus, inactivated *Pasteurella multocida* and *P. hemolytica*, and an aluminum ion adjuvant, which composition is effective as a one-dose shipping fever vaccine composition in cattle.

DETAILED DESCRIPTION OF THE INVENTION

We have found, according to this invention, that a one dose shipping fever vaccine composition can be prepared by mixing or commingling (a) a live, attenuated myxovirus parainfluenza-3 virus, generally in lyophilized form, with (b) a mixture of an inactivated bacterial mixture of *Pasteurella multocida* and *Pasteurella hemolytica*, and an aluminum ion adjuvant.

In preparing the bacterin portion of the composition of this invention, *Pasteurella multocida* and *Pasteurella hemolytica* are separately grown in agar or liquid nutrient media by conventional methods. If desired, the virulence of the bacteria can be increased by first growing the bacteria in chicken embryo allantoic-amnionic sac tissue or in tissue of mice, rabbit, or guinea pigs.

Seed cultures of the Pasteurella oragnisms can be grown in commercially available nutrient media by conventional methods.

In producing larger quantities of each bacterium, a lyophilized vial of each bacterial strain is used to inoculate a large volume of agar or tryptose broth to be used as production inoculum after 7 to 15 hours incubation. The quantity of seed can vary depending upon the vessel used. Usually enough of the bacterial broth seed culture is used to cover the agar surface. When liquid culture media are used, the medium is inoculated with from about 1 to 5 percent by volume of seed in the production broth culture. The bacterial cultures are incubated at about 36–38° C. for a time sufficient to allow the bacterial titer to grow to at least $10^7$, preferably $10^9$, viable bacterial cells per milliliter.

When the bacterial titer has grown to the desired viable bacterial cells per milliliter, portions of the separate media containing *Pasteurella multocida* and the *Pasteurella hemolytica* are mixed and then the pH of the resulting mixture is checked and adjusted, if necessary, to from about 6.4 to about 6.8. It is preferred to mix about equal volumes of the separate bacterium-containing media to provide about an equal concentration or titer of each bacterium. The pH of the mixture is adjusted to the desired pH by the addition of an acid, such as 0.1 N hydrochloric acid or base such as 0.1 N sodium hydroxide, as necessary. If desired, however, the pH of each bacterium mixture may be adjusted before mixing the bacterial media. To the pH adjusted bacterial mixture thus obtained, the inactivating agent, preferably formaldehyde or beta-propiolactone, is added to inactivate or kill the bacterial organisms.

For the inactivation, or bacteria-killing step, formaldehyde is preferably added. The formaldehyde solution is added in an amount to provide a concentration sufficient to inactivate the bacteria without materially impairing the antigenicity of the resulting vaccine. Usually about 0.0005 to about 0.125 percent by weight of formaldehyde is sufficient for this purpose. It is preferred to provide a final formaldehyde concentration of about 0.0005 to about 0.003 percent. It is understood, moreover, that formaldehyde can be employed in any form which provides the active aldehyde for contact with the bacteria, e.g., trioxymethylene, solid polymeric formaldehyde, or formaldehyde condensation products and the like which release formaldehyde in aqueous media. It will be equally apparent that the formaldehyde composition should not include substances which would be detrimental to the vaccine composition if they must be allowed to remain in the composition.

The inactivation of the bacteria mixture with formaldehyde appears to be essentially complete in about six hours. As a precautionary measure, however, the mixture is preferably held for from 1 to 3 days.

Excess formaldehyde in the resulting vaccine composition is then neutralized with a suitable formaldehyde absorber. A convenient neutralization agent for this purpose is a 10 to 35 percent sterile aqueous sodium bisulfite solution. Neutralization of excess formaldehyde is insure by testing samples of the neutralized, inactivated bacteria composition using Schiff's reagent as an indicator, during 1 to 3 consecutive days following inactivation. Samples of the resulting product are withdrawn for Standard Requirement P-15 bacteriological sterility testing and then the mixture is treated with a suitable parenterally acceptable antiseptic as a bacteriostatic and fungistatic preservative. Examples of antiseptics which can be used include chloroform, phenol, and thimerosal. We prefer to add thimerosal to a concentration of about 0.4 ml. to about 0.6 ml. of a 10 percent solution per liter of bulk product, but other antiseptics can be used.

Portions of each Pasteurella bacterium preparation are mixed to provide a mixture of the bacteria having a density equal to 5 to 10 times McFarland tube number 1 on the McFarland scale, preferably to a density equal to 7 to 8 on the McFarland scale. A photometer such as a "Cenco" photometer may be used for this purpose, if the photometer is properly standardized to the McFarland scale.

When beta-propiolactone (BPL) is used to inactivate the Pasteurella bacteria, either mixed or separately, the pH of the bacterium-containing medium is readjusted to about pH 8.0 using a buffer salt such as 1 M disodium hydrogen orthophosphate before adding the BPL in an amount to inactivate or kill the bacteria without impairing the use of the resulting composition in protecting cattle against shipping fever. We prefer to add BPL to the bacteria mixture, with mixing, to a final concentration between about 0.0005 and 0.003 percent of the total volume of mixture. The BPL-treated bacteria composition is allowed to stand at incubation temperature, preferably about 37° C., for from 1 to 3 days, and then the pH of the mixture is adjusted to a pH of about 7.0 to 7.2 following inactivation.

When the sterility testing of the bacteria mixture is completed, and excess formaldehyde or BPL has been neutralized, the aluminum ion adjuvant is added thereto. The aluminum ion-containing adjuvant used must be one which contains the trivalent aluminum ion in a pharmaceutically acceptable form. It may be in the form of an aqueous solution of a suitable aluminum salt, an adsorptive solid, or an aqueous aluminum ion-containing gel. Examples of suitable aluminum ion forms which may be used include aqueous aluminum hydroxide or aluminum oxide gels or aqueous dispersions, and aluminum salts and mixed salts of aluminum with various acids. Preferred forms of the aluminum ion-containing material are an aqueous aluminum hydroride gel, an aqueous active alumina suspension, and a hydrated aluminum phosphate, in freshly precipitated form for greatest activity. These materials can be prepared by metathesis of suitable precursor salts in aqueous solution or suspension, and then filtering and washing the resulting precipitate, suitable precautions being taken to insure sterility before use. Aluminum phosphate can be prepared, for example, by commingling aqueous solutions of aluminum chloride and disodium hydrogen orthophosphate, or aluminum potassium sulfate and trisodium orthophosphate. The resulting precipitate is filtered off and washed with water to remove soluble materials, and then can be added in the wet state to the bacteria mixture as described above. The aluminum ion-containing material is commingled with the inactivated bacterial mixture in an aqueous solution or gel or absorptive solid dispersion having an aluminum compound concentration of from about 0.5 percent to about 5 percent by weight, preferably from about 1 to 2 percent by weight, and is added to the bacteria pool in an amount to be chemically equivalent to from about 10 to 30 milliliters of aqueous 1.2 percent by weight aluminum oxide ($Al_2O_3$) per 100 ml. of the bacteria culture mixture. We prefer to use a 1.3 percent by weight aluminum hydroxide gel suspension in water, which aqueous suspension is added to a level of about 10 ml. per 50 ml. of the bacterial mixture. The pH may be lowered to from about 6.0 to 6.5 to facilitate precipitation and absorption, if necessary. The mixture is then mixed or stirred for 15 minutes to 1 hour to insure uniform composition. The mixture is held 24–48 hours and at this time the bacterin may be concentrated by drawing off up to 50 percent of the supernatant. The pH of the final product is preferably raised to a pH of about 7.0 to 7.2. The bacteria-aluminum ion adjuvant composition is then bottled or otherwise packaged aseptically. This bottled composition is useful as one fraction of the new shipping fever vaccine composition of the present invention.

An alternative method for inactivation and concentration of the bacterin may be used. This employs mixing the *P. multocida* and *P. hemolytica* cultures in the desired concentrations as described above, addition of the aluminum ion adjuvant at the level already stated, and mixing for 15 minutes. At this time the desired quantity of formaldehyde is added, using a 10 percent formalin solution. Shaking is continued for 15 minutes to 1 hour and the bacterin is held for from 1 to 3 days for inactivation. The bacterin can be concentrated by discarding supernatant and the formaldehyde is inactivated as described above.

The live, attenuated myxovirus parainfluenza-3 (MP–3) virus is prepared by serial passage or growth of the virus cells in bovine or simian kidney tissue culture media. We prefer to use the Lilly Laboratory Culture Monkey Kidney (LLC–$MK_2$) cell line for this virus attenuation. The virus is grown or passed through from about 5 to about 30 bovine or simian tissue culture growth cycles to modity the virus to the desired extent.

The virus is grown in the trypsinized primary bovine kidney tissue cell growth medium, or in the bovine cell line medium, or in simian tissue culture media as described above, until an infectivity titer of at least $10^3$ virus infected cells per milliliter is obtained. By way of example, a suitable virus titer can be obtained by incubating a virus-inoculated primary bovine kidney cell medium at about 35 to 38° C. for 2 to 7 days.

The virus seed and production cultures are propagated in primary or cell line or diploid cell strains from embryonic or adult bovine or simian kidney tissues, which are prepared by trypsinization of the tissues and dispersion of the cells in Hank's or Earle's balanced salt solution enriched with a small amount of lactalbumen hydrolysate. The production culture medium may contain bovine serum if desired, but it is not essential. Small amounts of penicillin and streptomycin can be used in the mixture as preservatives. The vessels used can be of any appropriate size. We have grown the virus in vessel sizes ranging from 2-ounce prescription bottles to 5-liter Povitsky bottles. The virus seed culture is lyophilized with sterile distilled water and a suitable stabilizer.

The production culture medium is inoculated with the lyophilized seed culture aseptically.

The seed volume is generally about 4 to 6 percent of the production medium volume.

Portions of the virus-containing production culture are used in each subsequent passage as the "seed" virus for the subsequent growth cycle. When the infectivity titer of the virus in a production culture of virus reaches the range of from about $10^3$ to about $10^9$ $TCID_{50}$, preferably $10^5$ to $10^7$ $TCID_{50}$, the virus is ready for harvest.

Only those virus-containing vessels which are visibly free of bacteria or other contamination are considered for the virus harvest. Satisfactory virus-laden tissue culture fluids are harvested by aseptically transferring the culture fluids, including the cells, to suitable pooling containers.

The live, attenuated virus-containing fluid can be used immediately as such, or it can be frozen, lyophilized, and packaged in the lyophilized state.

The improved shipping fever vaccine composition of this invention is prepared by reconstituting and diluting the fresh or lyophilized, live, attenuated, virus-containing tissue culture medium with the inactivated Pasteurella bacteria and aluminum ion adjuvant composition within about 8 hours, preferably within 2 hours of use. For example, a bottle containing 50 ml. of the inactivated Pasteurella bacteria and aluminum ion adjuvant composition is added aseptically to a bottle containing the lyophilized solid resulting from 10 ml. of attenuated PI-3 virus. The contents are mixed thoroughly. A 5 to 10 ml. portion of this resulting vaccine is injected into each of the cattle to be treated. Best results are obtained when the vacine is injected within 8 hours following the mixing of the two fractions. A single injection of about 5 ml. prior to shipment is generally sufficient to protect against shipping fever.

The potency of the virus can be measured by several methods. One such test method, which we term the hemagglutination inhibition (HI) activity method, involves the selection of six calves, 3 to 6 months of age, which have blood serum HI activity titers lower than 1:20, as measured by standard procedures with guinea pig red blood cells, and the inoculation of three of these calves with one intramuscular injection of 5 cc. dose of the live, attenuated virus, or vaccine composition containing the virus. All six calves are housed together during the test period. Samples of blood are taken from the six calves 2 to 3 weeks following the second injection. Comparative HI activity titer testing on pre- and post-vaccination blood serum samples must demonstrate a serum HI titer conversion to 1:80 or higher in the vaccinated calves with no significant increase in the serum titer of the unvaccinated calves. Where cattle are vaccinated with HI titers, a four-fold increase in titer is also considered to be indicative of serological conversion and potency of the vaccine virus. The potency of the composition can also be determined by challenge to vaccinated and unvaccinated calves with a combination of m. parainfluenza-3 and cultures of *P. multocida* and *P. hemolytica* given by the aerosol route or intratracheally or by other suitable route. Signs of shipping fever disease such as increased temperature, cough, and nasal discharge must not occur in the vaccinated calves and must occur in the control of unvaccinated calves. Potency can also be determined by suitable serum neutralization (SN) test or by correlating HI titer conversions in guinea pigs. Serological conversion in guinea pigs is indicated by demonstration of a 10-fold increase in geometric mean titer (GMT) in vaccinated guinea pigs with no significant increase in the GMT in the unvaccinated control guinea pigs.

The Pasteurella antigenic properties of the vaccine-bacterin composition of this invention can be established by the following test method:

Swiss mice weighing 15 to 20 g. are each given one 0.2 ml. subcutaneous injections of the inactivated bacteria containing compositions. After 7 to 14 days, equal numbers of vaccinated and unvaccinated mice are challenged with tenfold dilutions of virulent *P. multocida* broth culture. Both vaccinated and control mice are divided into dilution groups of 5 or more mice. At least 5 dilution groups are used for vaccinated mice and 5 for control mice. The post-challenge observation period is 7 days. Fifty percent mortality end points ($LD_{50}$) are calculated for both vaccinated and control mice according to the method of Reed and Muench. [Reed, L. J. and Muench, H. A., Am. J. Hyg., 27:493 (1938)]. The test is considered satisfactory if the $LD_{50}$ in vaccinated mice is at least two logs lower than that demonstrated in the unvaccinated mice.

The vaccine composition of this invention can be incorporated into multiple antigen combinations to permit simultaneous immunization of the cattle against two or more diseases. Such combinations can be made, for example, with antigens for Brucella sp., Clostridium sp., bovine virus diarrhea virus (BVDV) infectious bovine rhinotracheitis, (IBR) and the like.

More in detail, the invention is illustrated by the following examples:

EXAMPLE 1

Virus growth and attenuation

The live myxovirus parainfluenza-3 (MP-3) originally isolated by Dr. R. S. Reisinger, U.S. Department of Agriculture, Beltsville, Md., from a clinical case of bovine shipping fever, commonly referred to as the SF-4 strain, is modified by passing serially in tissue culture. The Lilly Laboratory Culture Monkey Kidney (LLC-$MK_2$ original) cell line is used for this modification.

Eagle's minimum essential medium is used to support growth of the cells and replication of the virus. This medium contains Earle's balanced salt solution and Spinner salts which are included in the following:

| | Mg./l. |
|---|---|
| NaCl | 6000.0 |
| KCl | 400.0 |
| $NaH_2PO_4 \cdot H_2O$ | 1440.0 |
| $MgSO_4 \cdot 7H_2O$ | 200.0 |
| $NaHCO_3$ | 2200.0 |
| Glucose | 2500.0 |
| L-phenylalanine | 32.0 |
| L-threonine | 48.0 |
| L-tryptophan | 10.0 |
| L-tyrosine | 36.0 |
| L-valine | 46.0 |
| Choline Cl | 1.0 |
| L-arginine | 105.0 |
| L-cystine | 24.0 |
| L-histidine | 31 |
| L-glutamine | 292.0 |
| L-isoleucine | 52.5 |
| L-leucine | 52.4 |
| L-lysine | 58.0 |
| L-methionine | 15.0 |
| Folic acid | 1.0 |
| i-Inositol | 2.0 |
| Nicotinamide | 1.0 |
| D-Ca pantothenate | 1.0 |
| Pyridocal HCl | 1.0 |
| Riboflavine | 0.10 |
| Thiamine HCl | 1.0 |
| Phenol red | 10.0 |

Two alternative methods are used for infecting the LLC-$MK_2$ cells with the SF-4 strain of MP-3 virus. In one method the cells are infected at the time of planting; i.e., after the tissues have been trypsinized and introduced into new tissue culture bottles containing fresh media and before cell attachment has taken place. In the alternative method, the planted bottles are observed for multiplication of cells, and the virus is introduced after at least 75 percent of the bottle surface has been covered with cells. This latter method is preferred.

The virus-infected cultures are incubated at 35±1° C. The virus-infected cells are harvested after they show either visual cytopathogenic effects (CPE) or satisfactory hemadsorption (HAD) of guinea pig red blood cells. Harvested material is centrifuged at 1500 r.p.m. for 5 minutes, and the supernatant is used to infect new cell monolayers. One passage cycle is considered to be that time from infection of cells until virus-infected cells are harvested. A total of 16 virus growth passage cycles are used to modiy the MP–3 virus.

Appromixately every third passage is checked for absence of pleuropneumonia like organisms (PPLO), and every tenth passage is checked for tissue culture infectivity titer. Primary bovine embroyonic kidney (BEK) cells are used to determine titer of the modified virus. The infectivity titer for the modified virus ranges from $10^5$ to $10^7$. $TCID_{50}$ (50 percent tissue culture infective dose) per milliliter, whereas the original SF–4 strain sample ranges from $10^{6.5}$ to $10^{8.5}$ $TCID_{50}$/ml.

One group of mice is inoculated intracerebrally and another intraperitoneally with harvested virus to demonstrate safety. No mice deaths due to the inoculation should occur. Cattle are injected intramuscularly and no adverse reactions should be observed.

Pasteurella hemolytica

P. hemolytica seed culture is first grown on tryptose and thiamine agar plates, incubated at 35° C. for 24 hours, and then used to inoculate the P. hemolytica to tryptose and thiamine broth cultures. The P. hemolytica is incubated in the broth cultures for 12 hours at 35° C. After checks to insure against contamination, the contents of several P. hemolytica containing broth cultures are pooled in sterile containers and used as seed for larger cultures of the organism. The growth medium is inoculated with P. hemolytica seed culture equivalent to about 3 percent of the production growth medium volume. The production cultures are incubated for 30 hours at 35° C. on a shaking apparatus. The production cultures are transferred to sterile containers and the density of the P. hemolytica cultures is determined using a "Cenco" photometer with a green filter, and the meter is set to 100 percent light transmission using a sterile medium for the P. hemolytica. This "Cenco" photometer is previously correlated to reproduce the densities between 7 and 8 on the McFarland scale. The P. hemolytica thus obtained is inactivated by adding formaldehyde solution thereto. After incubation of the formaldehyde inactivated P. hemolytica culture for 60 hours at 35° C., the inactivated bacterium is stored in a chill room (5° C.) until ready for use in preparing the vaccine composition of this invention.

The growth medium used for growing the P. hemolytica can be prepared from the following proportion of materials: 3.6 kg. of "N–Z Case" brand of a powdered protein and vitamin composition made by tryptic digestion of casein, 1.8 kg. of yeast extract, 1.2 kg. of tryptone, 120 g. of magnesium sulfate, 324 g. of monobasic potassium phosphate, 912 g. of dibasic sodium phosphate, and 960 g. of dextrose in 90 liters of water, warmed to 45° C., and then 900 ml. of yeast autolysate is added. The medium is adjusted to pH 7.2 to 7.3 using 1 normal sodium hydroxide solution, and then diluted with distilled water to 120 liters.

Pasteurella multocida

P. multocida is propagated as described above for P. hemolytica, except that the growth medium contains 480 g. of sucrose instead of the dextrose.

Portions of the P. multocida and P. hemolytica cultures are mixed in about equal volumes of each to obtain a mixed Pasteurella pool having a density of about 7.5 times McFarland tube No. 1, and then 37 percent aqueous formaldehyde is added and mixed to provide a formaldehyde concentration between about 0.0005 and 0.003 percent. The mixture is allowed to stand at 37° C. for about 24 hours and then the excess formaldehyde is neutralized using sterile 35 percent sodium bisulfite in water solution with Schiff's reagent as an indicator. Checks for complete neutralization are conducted daily using Schiff's reagent as an indicator for 3 consecutive days after inactivation to insure that no residual formaldehyde remained unneutralized. Appropriate sterility tests are made at this point.

At this time, a 1.3 percent aluminum oxide suspension in water is added to the inactivated Pasteurella mixture to a level of about 10 ml. to about 50 ml. per 100 ml. of the Pasteurella mixture. The pH is lowered to facilitate precipitation and the mixture is mixed for 45 minutes and then allowed to settle for 3 days. About 30 to 50 percent of the supernatant fluid is decanted, and then the pH of the remaining mixture is raised to between 7.0 to 7.2.

The bacteria aluminum ion adjuvant composition is then bottled aseptically and is used as one fraction of the new shipping fever vaccine of this invention.

A bottle containing 50 ml. of the inactivated Pasteurella bacteria and aluminum ion adjuvant is mixed aseptically with the lyophilized, live parainfluenza-3 virus solid resulting from 10 ml. of the attenuated PI–3 virus growth medium as described above. After mixing to insure uniform composition, a 5 ml. portion of this resulting vaccine is withdrawn from the aseptic vessel containing it and injected into each bovine animal.

We claim
1. A method for preparing a shipping fever vaccine which comprises:
   (a) growing myxovirus parainfluenza-3 virus and serially passing the virus in bovine or simian kidney tissue culture until the infectivity titer of the virus is within the range of from $10^3$ to $10^9$ $TCID_{50}$ per milliliter of medium;
   (b) aseptically packaging the live, attenuated virus obtained from step (a);
   (c) separately growing *Pasteurella multocida* and *Pasteurella hemolytica* in nutrient media;
   (d) mixing portions of *Pasteurella multocida* and *Pasteurella hemolytica* media in proportion such that the optical density of the mixture will be 5 to 10 times the optical density of McFarland tube number one on the McFarland test method scale;
   (e) treating the bacterial mixture from step (d) with an inactivating agent selected from the group consisting of formaldehyde and beta-propiolactone;
   (f) neutralizing any excess inactivating agent from step (e) with aqueous alkali metal bisulfite solution;
   (h) adding a parenterally acceptable antiseptic thereto in bacteriostatic and fungistatic amounts, and
   (i) commingling the inactivated Pasteurella bacteria composition from step (h) with an aluminum ion adjuvent selected from the group consisting of aluminum hydroxide gel, aluminum oxide dispersion, and aluminum phosphate in an aluminum ion concentration equivalent to from about 10 to about 50 ml. of an aqueous 1.3 percent aluminum oxide ($Al_2O_3$) dispersion per 100 ml. of the bacterial mixture, and
   (j) commingling the atenuated myxovirus parainfluenza-3 virus from step (b) with the inactivated bacteria-aluminum ion adjuvant composition from step (i) for administration to cattle.

2. An improved shipping fever vaccine composition which comprises a mixture of (a) an inactivated mixture of *Pasteurella multocida* and *Pasteurella hemolytica*; (b) a live, myxovirus parainfluenza-3 virus, attenuated by serial passage through bovine or simian kidney cell tissue cultures until the infectivity titer for the thus modified virus ranges from about $10^3$ to about $10^9$ TCID$_{50}$ per milliliter and (c) an aluminum ion adjuvant said vaccine composition being prepared as described in claim 1.

3. A composition as described in claim 2 wherein the infectivity titer of the live, attenuated virus (b) ranges from about $10^5$ to about $10^7$ TCID$_{50}$ per milliliter and the aluminum ion adjuvant (c) is an aqueous aluminum hydroxide gel dispersion containing from about 1 to about 2 percent by weight of the aluminum hydroxide gel.

4. A method for immunizing bovine animals against myxovirus parainfluenza-3 virus infection and Pasteurellosis associated with shipping fever which comprises injecting the bovine animal with one dose of from about 5 to 10 cc. of the composition defined in claim 2.

5. A method for preparing an improved shipping fever vaccine which comprises commingling (a) a lyophilized, live attenuated myxovirus parainfluenza-3 virus with (b) a mixture of inactivated *Pasteurella multocida* and *Pasteurella hemolytica,* and an aluminum ion adjuvant selected from the group consisting of aluminum hydroxide gel, aluminum oxide dispersion, and aluminum phosphate in an aluminum ion concentration equivalent to from about 10 to about 50 ml. of an aqueous 1.3 percent aluminum oxide (Al$_2$O$_3$) dispersion per 100 ml. of inactivated Pasteurella culture.

References Cited

Reisinger et al., J.A.V.M.A., 135(3), 147–152, Aug. 1, 1959.

Gale et al., J.A.V.M.A. 142(8), 884–887, Apr. 15, 1963.

King et al., J.A.V.M.A. 142(8), 881–883, Apr. 15, 1963.

Mohanty et al., Am. J. Vet. Res. 25, 1653–1654 (1964).

Hamdy et al., Am. J. Vet. Res. 25, 1648–1652 (1964).

Hamdy et al., Cornell Vet. 54, 41–49 (1964).

Matsuoka et al., Proc. 69th Ann. Meet., U.S. Livestock Sanit. Ass'n. (1965), pp. 104–108 (1966).

SHEP K. ROSE, Primary Examiner

U.S. Cl. X.R.

424—92